(12) United States Patent
Vullings

(10) Patent No.: US 9,347,475 B2
(45) Date of Patent: May 24, 2016

(54) SELF-LOCATING MECHANICALLY ACTIVATED FASTENER

(75) Inventor: Peter Vullings, Palmerston North (NZ)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 132 days.

(21) Appl. No.: 14/110,919

(22) PCT Filed: Apr. 25, 2011

(86) PCT No.: PCT/US2011/033810
§ 371 (c)(1),
(2), (4) Date: Oct. 9, 2013

(87) PCT Pub. No.: WO2012/148377
PCT Pub. Date: Nov. 1, 2012

(65) Prior Publication Data
US 2014/0109380 A1   Apr. 24, 2014

(51) Int. Cl.
*F16B 21/00* (2006.01)
*F16B 13/08* (2006.01)

(52) U.S. Cl.
CPC ....... *F16B 13/0808* (2013.01); *Y10T 29/49959* (2015.01)

(58) Field of Classification Search
CPC .... F16B 5/0642; F16B 13/08; F16B 13/0808; F16B 21/00; F16B 37/04; F16B 37/042
USPC .......................... 411/340, 344, 345
See application file for complete search history.

(56) References Cited

U.S. PATENT DOCUMENTS

| 2,922,211 | A | | 1/1960 | Boyd | |
|---|---|---|---|---|---|
| 3,074,134 | A | * | 1/1963 | Buechler | F16B 5/128 24/289 |
| 3,213,745 | A | * | 10/1965 | Dwyer | F16B 13/06 174/153 G |
| 3,312,138 | A | * | 4/1967 | Cumming | E21D 21/008 411/21 |
| 3,352,195 | A | * | 11/1967 | Fisher | F16B 37/043 24/453 |
| 3,959,853 | A | * | 6/1976 | Talan | F16B 13/04 411/510 |
| 4,276,806 | A | * | 7/1981 | Morel | F16B 19/1081 411/15 |
| 4,377,358 | A | * | 3/1983 | Wollar | F16B 13/061 411/15 |
| 4,662,808 | A | * | 5/1987 | Camilleri | F16B 13/12 411/340 |
| 4,874,276 | A | * | 10/1989 | Iguchi | F16B 19/1081 24/297 |
| 5,944,466 | A | * | 8/1999 | Rudnicki | F16B 13/04 411/340 |

(Continued)

OTHER PUBLICATIONS

Hawse, Angela. "Trango MaxCam & Superfly Reviews", Nov. 3, 2006, published online at [http://www.goaao.com/maxcam_testimonials.htm], retrieved Oct. 9, 2013, 8 pages.

(Continued)

*Primary Examiner* — Roberta Delisle
(74) *Attorney, Agent, or Firm* — Amin, Turocy & Watson, LLP

(57) ABSTRACT

Fasteners are generally described. In some examples, a fastener may include at least one latch. The at least one latch may include an arcuate portion and a linking portion. The arcuate portion may be connected by the linking portion to a pivot point. The pivot point may be located with respect to the first member so that, as the linking portion pivots around the pivot point, the arcuate portion moves along an arcuate path between a non-fastening position and a fastening position. In the fastening position the arcuate portion may extend beyond the first member to engage with the second member to secure it to the first member.

31 Claims, 3 Drawing Sheets

(56) References Cited

U.S. PATENT DOCUMENTS 5,991,984 A * 11/1999 Schaty ............... F16B 13/0808
24/609
2004/0208722 A1 * 10/2004 Kuenzel ............. F16B 13/0833
411/340

OTHER PUBLICATIONS

"Quick-operating Fasteners", Nov. 15, 2002, Machine Design, published online at [http://machinedesign.com/basics-design/quick-operating-fasteners], retrieved Oct. 9, 2013, 5 pages.

DDWIKI. "Active climbing cam", Aug. 26, 2010, published online at [http://ddl.me.cmu.edu/ddwiki/index.php/Active_climbing_cam], retrieved Oct. 9, 2013 (via Internet Archive Wayback Machine), 8 pages.

"Mechanical Fasteners", Mar. 28, 2010, published online at [http://www.globalspec.com/productfinder/mechanical_components/mechanical_fasteners], retrieved Oct. 9, 2013 (via Internet Archive Wayback Machine), 3 pages.

Wikipedia. "Worm Drive," accessed at http://web.archive.org/web/20101116074307/http://en.wikipedia.org/wiki/Worm_drive, last modified on Nov. 5, 2010, retrieved on Dec. 4, 2014, pp. 1-4.

* cited by examiner

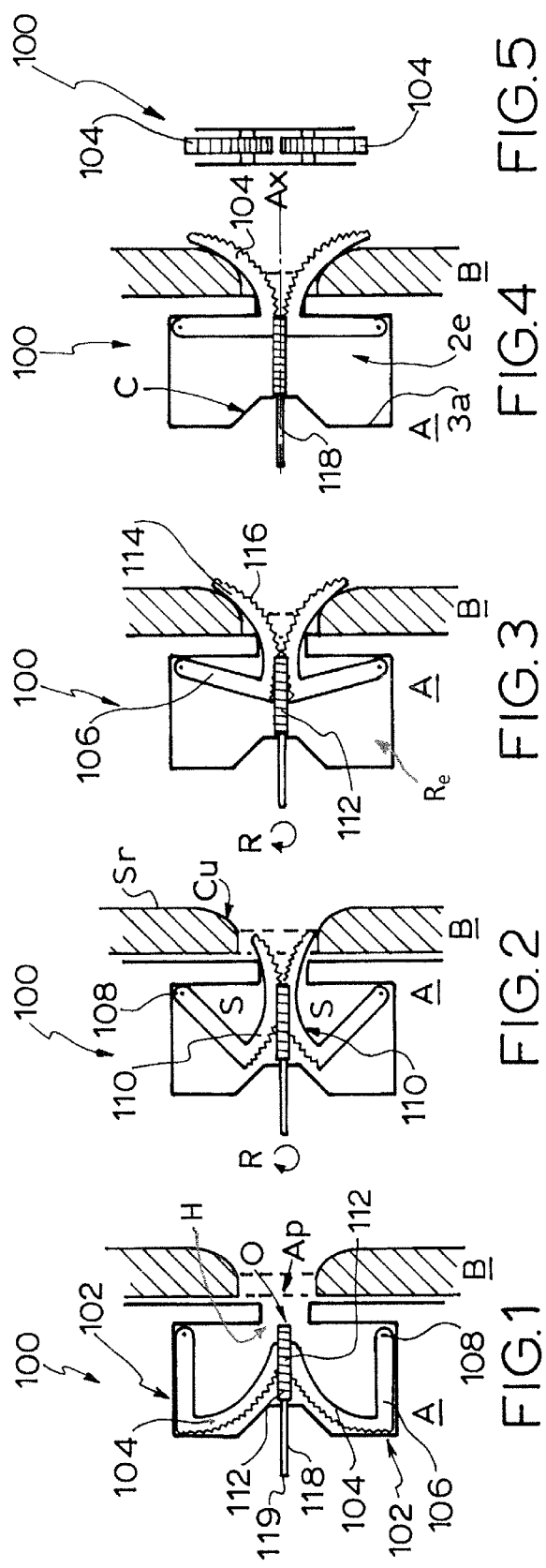

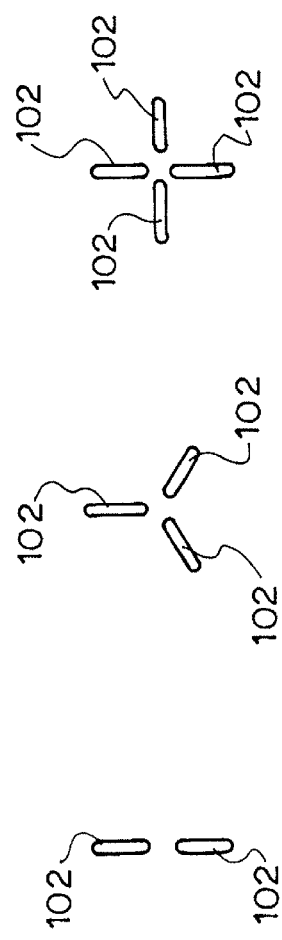

SELF-LOCATING MECHANICALLY ACTIVATED FASTENER

CROSS-REFERENCE TO RELATED APPLICATION

The subject application is a U.S. national phase application under 35 U.S.C. §371 of PCT Application Serial No. PCT/US2011/033810, filed Apr. 25, 2011, and entitled "SELF-LOCATING MECHANICALLY ACTIVATED FASTENER", the disclosure of which is incorporated herein by reference in its entirety.

BACKGROUND

Unless otherwise indicated herein, the materials described in this section are not prior art to the claims in this application and are not admitted to be prior art by inclusion in this section.

In prefabricated buildings, components such as internal walls, cabinetry, shelves, fixtures, fittings, etc are erected and fastened together on site, and may be uncoupled for internal space reorganization, for alternative use of space, or for deconstruction and removal of the building.

Where permanent fasteners have been employed to fasten such components together this can hinder the uncoupling of components and deconstruction of the building. Also, the components can be damaged, requiring repair or replacement.

SUMMARY

In some embodiments, a fastener is generally described. An example fastener is able to be mounted or incorporated with respect to a first member to enable the first member to be secured to a second member. The example fastener may include at least one latch. The at least one latch may include an arcuate portion and a linking portion. The arcuate portion may be connected by the linking portion to a pivot point. The pivot point may be located with respect to the first member so that, as the linking portion pivots around the pivot point, the arcuate portion moves along an arcuate path between a non-fastening position and a fastening position. In the fastening position the arcuate portion may extend beyond the first member to engage with the second member to secure it to the first member.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the drawings:

FIGS. 1 to 4 show diagrammatic side section views of an example fastener in progressive stages of fastening a first part A to a second part B;

FIG. 5 shows a front view of the fastener in the stage as depicted in FIG. 4;

FIG. 6 schematically depicts, in end view, three possible arm configurations for the fastener.

DETAILED DESCRIPTION

Figure 7:
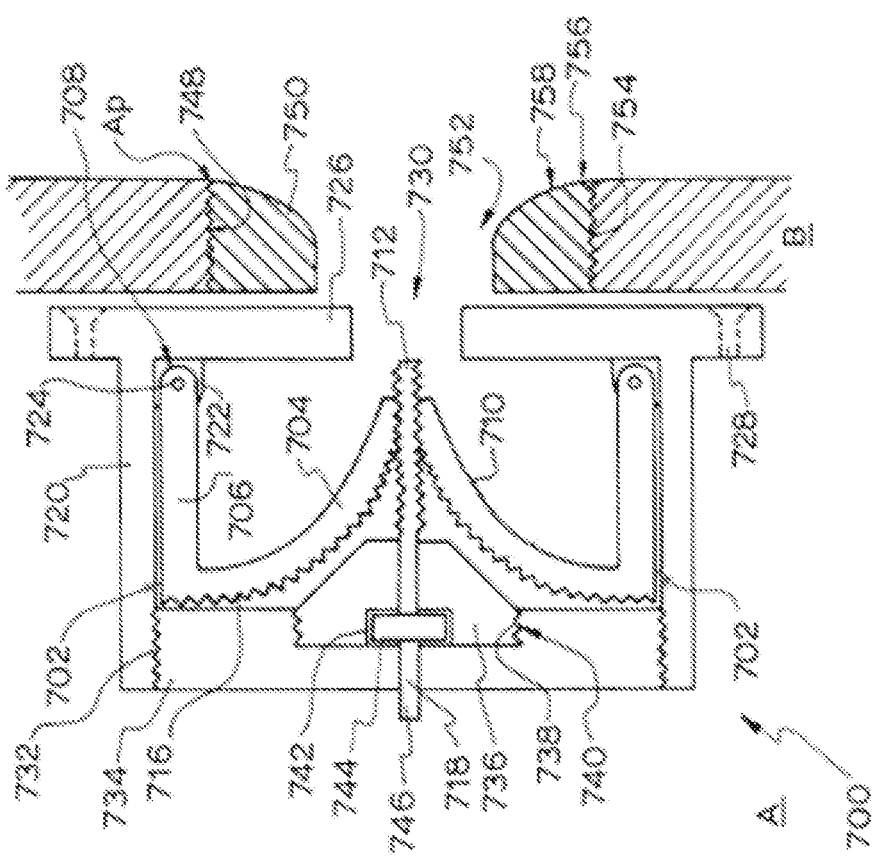
FIG. 7 shows a side section view of an embodied example fastener for fastening a first part A to a second part B, all arranged according to at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally directed, inter alia, to methods, apparatus, systems, and members that employ a fastener for securing a first member to a second member.

Briefly stated a fastener is generally disclosed. An example fastener can be mounted to a first member or incorporated in the first member. The fastener can enable the first member to be releasably secured to a second member. The fastener has at least one latch, and may have, for example, two to four latches. Each latch has an arcuate portion and a linking portion. The arcuate portion may be connected by the linking portion to a pivot point. The pivot point may be located with respect to the first member so that, as the linking portion pivots around the pivot point, the arcuate portion moves along an arcuate path between a non-fastening position and a fastening position. In the fastening position the arcuate portion may extend beyond the first member to engage with the second member to secure it to the first member. The arcuate portion may be moved in reverse along the arcuate path from the fastening position to the non-fastening position to release the first member from the second member.

FIG. 1 is a diagrammatic side sectional representation of an example fastener 100 that is arranged according to at least some embodiments described herein. The example fastener 100 is in a non-fastening position and is located with respect to a first part A that is to be releasably secured to a second part B.

The example fastener 100 may be employed to secure a first component part A that may take the form of a component such as a wall, door, shelf, fixture, cabinetry, furniture item, wall mounting, fixture, fitting, etc to a second component part B that may also take the form of a component such as a wall, door, shelf, fixture, cabinetry, furniture item, wall mounting, fixture, fitting, etc. Such component parts A and B may be found in, for example, prefabricated buildings. Such component parts A and B may also be found in non-prefabricated buildings (e.g. that are built from the ground up). Like and unlike components A and B may be fastened together using the example fastener 100.

It should be appreciated that the example fastener 100 is not limited to use with components in buildings, and may be used to secure together a range of different components in vehicles, installations and machinery, etc.

The example fastener 100 has two latches 102 although, as schematically illustrated in FIG. 6, may have two, three or four latches, or more. Each latch 102 has an arcuate part 104 and a linking part 106. The linking part 106 projects from the arcuate part 104 in a direction that defines a space S between the linking and arcuate parts. The component part B is received into the space S as the latch 102 is progressively moved into the fastening position, as will be described with reference to FIGS. 2 to 4. This releasably secures/joins the component part A to the component part B.

Each latch 102 may be fabricated of any suitable material, such as plastic, steel, aluminium, etc. The material selected may relate to the size, purpose and required strength/durability of the example fastener 100.

The linking part 106 is shown as projecting from one end of the arcuate part 104. However, the linking part 106 may project from an intermediate location along the arcuate part 104.

The arcuate part 104 is connected by the linking part 106 to a pivot point 108. The pivot point 108 may be located at or adjacent to the component part A. In this regard, the pivot point 108 may form part of the fastener 100 or may form part of the component part A. The pivot point 108 may comprise a pin and mounting arrangement, or may comprise a pivot coupling, pivot bearing, pivot joint, etc.

The arcuate part 104 has an inner curved surface 110 that faces into the space S. As shown with reference to FIGS. 2 to 4, when the linking part 106 is caused to pivot around the pivot point 108, the arcuate part 104 moves along an arcuate path from the non-fastening position of FIG. 1 to the fastening position of FIG. 4. The inner curved surface 110 is able to progressively engage with the component part B to urge it towards the component part A and into securement therewith.

The linking part 106 may be caused to pivot around the pivot point 108 either manually (such as by finger actuation) or by a mechanical drive. In the example fastener 100 of FIGS. 1 to 4, actuation by a mechanical drive is depicted, but it should be understood that in the example fastener a mechanical drive is not required.

In some examples, the example fastener 100 may have a lock to retain the arcuate part 104 in the fastening position (FIG. 4). The lock may also retain the arcuate part 104 in the non-fastening position (FIG. 1). The lock may be provided by first and/or second catches that each act on a respective latch 102 when in the fastening position (FIG. 4) or when in the non-fastening position (FIG. 1) to retain the latch in each of those positions.

In some alternative examples, the mechanical drive can function as a lock to retain each latch 102 in the fastening position (FIG. 4) or in the non-fastening position (FIG. 1). The mechanical drive may additionally function as a lock to retain each latch 102 in one or more positions that are intermediate the fastening and non-fastening positions (FIGS. 2 and 3).

Movement or actuation of the mechanical drive can cause each latch 102 to pivot between the non-fastening and fastening positions. In some examples, when the mechanical drive is moved/actuated it may be positioned to engage with the arcuate part 104 of each latch 102.

In some examples, an outwardly facing surface 114 of the arcuate part 104 is deformed to enable its engagement with a corresponding surface of the mechanical drive during movement of the mechanical drive.

In some examples, the mechanical drive includes a shaft and the corresponding surface of the mechanical drive may have a generally screw-shaped profile extending along the length of the corresponding surface. When the shaft of the mechanical drive is moved it engages with the deformed surface 114 of the arcuate part 104 to cause each latch to pivot.

The mechanical drive may take the form of a worm screw 112. A worm screw is able to provide a dual function of engaging with the arcuate part 104 of each latch 102 and also to act as a lock for each latch 102. Alternatively, the mechanical drive may take the form of a gear, or a series of gears, that can be supported in the fastener to rotate and engage with the arcuate part 104 of each latch 102. In a further alternative, the mechanical drive may take the form of a rack having a series of teeth or other protuberances that engage with the arcuate part 104 of each latch 102. The rack can be supported to extend and retract with respect to the fastener 100.

In yet another alternative, the latch 102 may be moved by a lever, pushrod, or a combination of these, to move the latch through its arc. The lever/pushrod can be attached, by way of a freely moving joint, to the junction of arcuate part 104 and linking part 106.

For example, when the mechanical drive takes the form of a worm screw, or gear(s), or a rack, or other teethed or threaded-type drive, the deformed surface 114 may be provided with corresponding worm gear teeth 116 or other teeth or protuberances along its length (e.g. along the full length of the arcuate part 104). The corresponding teeth 116 or other teeth or protuberances engage, mesh and/or otherwise interact with the worm screw 112 or the teeth of the gear(s) or rack etc, during movement/actuation of the mechanical drive.

Generally, the path of travel of each latch 102 as it pivots between the non-fastening and fastening positions is such as to maintain the corresponding teeth 116 in engagement with the worm screw 112, or gear or rack teeth throughout. This allows the mechanical drive to also function as a lock for each latch at the non-fastening and fastening positions, and at positions therebetween.

In some examples, a portion of the shaft of the mechanical drive may extend beyond the component part A. This portion may be used to actuate the mechanical drive to in turn cause each latch 102 to pivot. For example, the portion of the shaft may take the form of an elongate projection 118. This projection 118 may be rotated manually such as by a user's fingers. For example, a knob, wheel, screw-head, handle, etc may be attached to a distal end 119 of the projection to facilitate manual gripping.

Alternatively, the projection 118 may be shaped (e.g. with a hexagonal profile) to be engaged by a tool such as pliers, a spanner, a socket wrench, etc. In a further alternative, the projection 118 may be shaped for engagement by a powered drive, such as the head/chuck of a powered drill, a powered screwdriver, or an electric motor/gearbox attached to the projection, etc.

In some examples, the fastener 100 can include a plurality of like latches 102. FIGS. 1 to 5 show a fastener 100 that has two such latches 102 arranged in an opposed configuration in the fastener 100. FIG. 6 schematically illustrates arrangements in which two, three, four, etc configurations of latches 102 may be employed in the example fastener 100. For three or more latches 102, the spacing of each latch from each other latch can be even, moving around the fastener. Further, the plurality of latches may be spaced around a central axis $A_x$ of the fastener 100.

In some examples, the mechanical drive may be configured and arranged to engage with the arcuate part 104 of each such latch 102. In other words, a single mechanical drive can engage multiple latches simultaneously. Thus, movement of the mechanical drive can cause each of the latches 102 to simultaneously pivot between the non-fastening (FIG. 1) and fastening (FIG. 4) positions, and to intermediate positions therebetween (FIGS. 2 and 3).

In some examples, the mechanical drive is arranged along the axis $A_x$. For example, when the mechanical drive takes the form of an elongate worm screw 112 (or e.g. an elongate rack), the elongate axis of the worm screw 112 can coincide with and lie along the axis $A_x$. Further, when the plurality of latches 102 are spaced around the axis $A_x$, actuation of the mechanical drive, such as by the rotation of the worm screw around its elongate axis as illustrated by arrow R, can cause the arcuate part 104 of each latch to move along its arcuate path. As illustrated by the sequence of each latch moving from the non-fastening position to the fastening position in FIGS. 1 to 4, this arcuate path progressively converges with the path of each other arcuate part 104 and towards the mechanical drive along the axis $A_x$, with each path then progressively diverging away from the axis $A_x$ as the fastening position is approached.

As best illustrated by FIGS. 2 to 4, this convergence and divergence of each arcuate part 104 enables each arcuate part 104 to pass through a relatively narrow opening O of the component part A located with respect to the fastener 100. The opening O may be circular, although with a two-latch fastener a slotted opening may be employed and may be simple to form.

Having passed through the opening O, each arcuate part 104 may then diverge away from the axis $A_x$, so that it may then function to progressively latch behind the component part B (FIGS. 3 and 4).

In FIGS. 1 to 5, the example fastener 100 is mounted so as to be incorporated in the component part A. For example, a recess $R_e$ can be formed or defined in the component part A. Each pivot point 108 may then be mounted or secured in a spaced relationship around the axis $A_x$ in the recess $R_e$. The respective linking parts 106 of each latch 102 may then be connected to a respective pivot point 108. A mechanical drive in the form of a worm screw 112 and projection 118 can be positioned between the arcuate parts 104 of the latches 102. The projection 118 can extend through a preformed hole H that is formed or defined to extend through the component part A, with the hole H extending through to an opposing base $B_a$ of the recess $R_e$. A raised central portion C is also defined in the base $B_a$ to support the worm screw 112. Alternatively, the base $B_a$, side walls of the recess $R_e$ and central portion C may be defined by discrete preformed components that are each mounted into the preformed recess $R_e$.

The recess $R_e$ may then be closed, such as by a plate, cover or cap that has the opening O defined or formed therein. When the latches 102 are in the non-fastening position of FIG. 1, the arcuate part 104 of each latch 102 is fully retracted within the recess $R_e$ of component part A.

In FIGS. 1 to 5, the component part B may also be adapted to cooperate with example fastener 100. In this regard, an aperture $A_p$ may be provided in the component part B that is shaped and configured to receive and engage with the arcuate parts 104 of each latch 102, as each latch moves progressively to the fastening position. Generally the aperture $A_p$ is substantially circular, even for a two-latch example fastener 100, to allow for and accommodate any rotational offset between the component part A and the component part B at the time of securement.

A reverse side $S_r$ of the component part B may be provided with a curvature $C_u$ around the perimeter of the aperture $A_p$. The curvature $C_u$ is selected to generally match the inner curved surface 110 of the arcuate part 104 that faces into the space S. The curvature $C_u$ is shaped in such a way as to promote the self-location of the fastener 100 as the latches progress to the fastening position. In this regard, and as illustrated in the sequence of FIGS. 1 to 4, as each latch 102 moves progressively to the fastening position, the inner curved surface 110 of each arcuate part 104 engages with the curvature $C_u$ of the aperture $A_p$, causing the component part B to be urged into the space S, and towards and centrally against the fastener 100 at component part A.

FIG. 7 shows another example fastener 700. The fastener 700 may be embodied as a unit, ready to be mounted into component part A. In example fastener 700 like reference numerals are used to those employed for the example fastener 100, except that the prefix numeral "7" will be employed instead of "1". In addition, the parts that are similar to the example fastener 100 will not be redescribed.

In example fastener 700, the unit comprises a casing 720. The casing 720 may take the form of a cylindrical container which houses the latches 702. The linking part 706 of each latch 702 is attached to the casing 720 via hinges 722 located at each of the pivot points 708. The hinges 722 can include hinge pins 724 (e.g. of a hard-wearing, shear-resistant metal).

The casing 720 can be installed into a preformed, cylindrical recess of the component part A (e.g. a cavity formed in a portable, temporary or permanent wall, etc). This installation may be prefabricated (e.g. at a factory) or on-site during building erection. When prefabricated, the component part A can be supplied ready-for-securing.

The casing 720 defines an external plate portion 726 in which opposing bolt holes 728 are formed to enable securement of the casing to the component part A (such as via screws, bolts, self-tapping screws, etc). Alternatively, the casing 720 may be externally threaded for screwing into an internally threaded recess. The plate portion 726 also has a central opening 730 out of which the arcuate part 704 of each latch 702 can extend as it moves progressively into the fastening position.

In example fastener 700, a rear opening of the casing 720 can be internally threaded 732, and an externally threaded end cap 734 can be mounted in that rear opening. The end cap 734 screws into the open end of the casing to complete the fastener 700. Alternatively, the end cap may be fastened to the casing 720 via bolts or screws, or push-fit or interference-fit, optionally with adhesive.

A frusto-conical flange cap 736 having an externally threaded portion 738 can be centrally pre-mounted (i.e. before the end cap 734 is mounted in the casing rear opening) in an internally threaded recess 740 located at an inside face of the end cap 734. Alternatively, the flange cap 736 may be fastened to the end cap 734 via bolts or screws, or push-fit or interference-fit, optionally with adhesive.

A flange-receiving recess 742 can be provided at an inside face of the flange cap 736. The flange-receiving recess 742 can receive a retention flange 744 that projects out from and around the projection 718 of the mechanical drive. For additional strength, the projection 718, retention flange 744, and worm screw 712 may be integrally formed from the one piece (e.g. machined from metal or moulded from plastic). The projection 718 can be provided with a length such that a distal end 746 of the projection projects beyond the end cap 734. The distal end is able to be configured for manual engagement, or by a tool, as outlined above for the projection 118 of example fastener 100.

Alternatively, the flange cap 736 can have a similar shape and size to the threaded end cap 734 to be attached directly to the casing 720. This modified flange cap 736 can have a trailing recess for the retention flange 744 and may first be screwed into place in the casing. The end cap 734 can then be screwed into the casing behind it, and flush against the flange cap 736. In yet a further alternative, the arrangement of the end cap 734 and flange cap 736 in the casing 720 may be reversed (i.e. the flange cap 736 is screwed into the end cap 734 at a distal end thereof, to be located outside the casing 720).

The end cap 734, together with the flange cap 736, hold and locate the retention flange 744 in the flange-receiving recess 742. This maintains the axial location of the projection 718 such that, as the projection 718 is rotated to rotate the worm screw 712, the mechanical drive does not move axially forwards or backwards. Instead, the worm screw 712 engages with the worm gear teeth 716 of the arcuate part 704 of each latch 702, causing each latch to pivot around its respective pivot point 708, between the non-fastening and fastening positions. Depending on the application, the end cap 734 and/or the flange cap 736 can include bearings for the projection 718 to ensure there is no binding or catching therewith.

An optional externally threaded 748 seating ring 750 having a hole 752 therethrough may be screw mounted into an internal thread 754 of aperture $A_p$ in the component part B (which component may take the form of a moveable item, such as a wall, fixture, shelf, cabinetry, cupboard, fitting, fixture, etc). However, depending on the application, the seating ring 750 may alternatively be attached to the component part B with bolts or screws, adhesive, etc. In a further alternative, the aperture $A_p$ in the component part B can simply be preformed to have a desired profile (i.e. prior to attaching the fastener 700 thereto).

The seating ring 750 can be installed into a preformed, cylindrical aperture of the component part B. Again, this installation may be prefabricated (e.g. at a factory) or on-site during building erection. When prefabricated, the component part B can be supplied ready-for-securing.

A reverse side 756 of the seating ring 750 can be provided with a peripheral curvature 758 for engaging with the inner curved surface 710 of each arcuate part 704. Alternatively, the reverse side 756 of the seating ring 750 can be bevelled. In either case, the curvature or bevel allow the latches 702 to incrementally/progressively tighten the join between the component part A and the component part B as the latches 702 move to the fastening position.

The reverse side 756 of the seating ring 750 may be provided with a relatively harder-wearing but relatively low friction surface, such as a metal alloy, hard plastic, ceramic composite, etc. As the arcuate part 704 of each latch 702 progressively extends out of the opening 730 in the plate portion 726 and into the hole 752 they make contact with the seating ring 750 at curvature 758, drawing the component part B centrally against the example fastener 700, and securing component parts A and B together.

Once either of the example fasteners 100, 700 has been installed in component part A, and when either the aperture $A_p$ has been formed in, or the seating ring 750 has been installed in, the component part B, each of the example fasteners is ready for use to secure component parts A and B together.

In use, with the latch(es) 102, 702 in the non-fastening position (FIGS. 1 and 7), the aperture $A_p$, or the hole 752 of the seating ring 750, of the component part B is located in alignment with the opening O or 730 respectively of the example fasteners 100, 700 of the component part A. The distal end 119 or 746 of the projection 118, 718 can then be engaged and rotated manually or by a tool/drive to actuate the mechanical drive. This rotates the worm screw 112, 712, causing each of the latches 102, 702 to start to pivot about the pivot points 108, 708 and towards the fastening position (FIG. 4).

The arcuate part 104, 704 of each latch progressively extends out (FIGS. 2 and 3) of the opening O or 730 respectively and its inside face 110, 710 starts to engage with the curvature $C_u$ or 758 of aperture $A_p$ or seating ring 750 in the component part B. This causes the component part B to be drawn in and against the component part A, with the evenly spaced latches causing a self-centering (self-locating) of the opening O or 730 with the aperture $A_p$ or the hole 752. When the latches reach the fastening position the component parts A and B generally abut and are joined (secured together). To release the component part B from the component part A, the distal ends 119, 746 are rotated in the opposite direction, until the latches disengage from the aperture $A_p$ or seating ring 750 in the component part B. The fasteners in the component part A can be reused with the same or different component part B.

It should be understood that either of the example fasteners 100, 700 may be used with either of the aperture $A_p$ or the seating ring 750 in the component part B.

As will be understood, each of the example fasteners 100, 700 may also secure the component part A to the component part B before each latch 102, 702 reaches the fully pivoted fastening position.

The example fasteners 100, 700 may be non-permanent, self-locating, activated manually, mechanically/electrically (e.g. by use of an electric motor/gearbox), are simple in design and can be made of a variety of materials depending on the application.

While the above description is concerned with a fastener for use with components in buildings (prefabricated and built on site) it will be understood that the fastener is not limited to such applications. For example, it may be used as a fastener in cabinetry, furniture, machinery, vehicles, etc.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Further, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a fastener having at least one of A, B, and C" would include but not be limited to fasteners that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a fastener having at least one of A, B, or C" would include but not be limited to fasteners that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub-ranges as discussed above. Finally, as will be understood by one skilled in the art, a range includes each individual member.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods which can, of course, vary. It is also to be understood that the terminology used herein is for the purpose of describing particular embodiments only, and is not intended to be limiting.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A fastener able to be mounted or incorporated with respect to a first member to enable the first member to be secured to a second member, the fastener comprising at least one latch, the at least one latch comprising an arcuate portion and a linking portion, the arcuate portion being connected by the linking portion to a pivot point that is able to be located with respect to the first member so that, as the linking portion pivots around the pivot point, the arcuate portion moves along an arcuate path between a non-fastening position and a fastening position in which the arcuate portion extends beyond the first member to engage with the second member to secure it to the first member, and the fastener further comprising:
   a mechanical drive that is positioned to engage with the arcuate portion resulting in a movement of the mechanical drive that causes the at least one latch to pivot between the non-fastening and fastening positions.

2. The fastener of claim 1, wherein the linking portion projects from the arcuate portion in a direction that defines a space between the linking and arcuate portions, and into which space the second member is received when the latch is in the fastening position to secure the second member to the first member.

3. The fastener of claim 2, wherein the arcuate portion comprises an inner curved surface that faces into the space so that, as the arcuate portion moves along the arcuate path from the non-fastening position to the fastening position, the inner curved surface of the arcuate portion that faces into the space engages the second member to urge it towards the first member and into securement therewith.

4. The fastener of claim 1, further comprising a plurality of like latches that are located with respect to the first member so that, as the linking portion of each latch pivots from the non-fastening position to the fastening position around its respective pivot point, the arcuate portion of each latch moves along an arcuate path that progressively converges with the path of each other arcuate portion and towards an axis of the fastener, with each path then progressively diverging away from the axis.

5. The fastener of claim 4, wherein the axis extends centrally through the fastener and the plurality of latches are evenly spaced around the axis.

6. The fastener of claim 1, wherein the linking portion projects from one end of the arcuate portion, with an opposing end of the arcuate portion locating behind a part of the second member in the fastening position to latch the fastener thereto.

7. The fastener of claim 1, further comprising a lock to retain the arcuate portion of the at least one latch in the fastening position.

8. The fastener of claim 7, wherein the lock comprises the mechanical drive.

9. The fastener of claim 8, wherein a surface of the arcuate portion is deformed to enable its engagement with a corresponding surface of the mechanical drive during movement of the mechanical drive.

10. The fastener of claim 9, wherein the deformed surface comprises teeth provided along the length of the arcuate portion.

11. The fastener of claim 9, wherein the mechanical drive comprises a shaft and the corresponding surface comprises a screw-shaped profile extending along the length of the corresponding surface which, when the shaft is moved, engages with the teeth of the arcuate portion to cause the at least one latch to pivot.

12. The fastener of claim 11, wherein the shaft comprises a worm screw that engages with worm gear teeth along the arcuate portion when the worm screw is rotated.

13. The fastener of claim 11, wherein a portion of the shaft extends beyond the first member and is used to actuate the mechanical drive to cause the at least one latch to pivot.

14. The fastener of claim 13, wherein the shaft portion is rotated manually, by a tool or by a powered drive.

15. The fastener of claim 8, further comprising a plurality of like latches, wherein the mechanical drive is positioned to engage with the arcuate portion of each latch, such that movement of the mechanical drive causes each of the latches to simultaneously pivot between the non-fastening and fastening positions.

16. The fastener of claim 15, wherein the mechanical drive is arranged along an axis, with the plurality of latches being spaced around the axis such that the arcuate portion of each latch moves along an arcuate path that progressively converges with the path of each other arcuate portion and towards the mechanical drive along the axis, with each path then progressively diverging away from the axis.

17. The fastener of claim 1, wherein the fastener is mounted or incorporated with respect to the first member such that, when in the non-fastening position, the arcuate portion of the at least one latch is fully retracted within the first member.

18. The fastener of claim 1, further comprising a casing for supporting the at least one latch therewithin, with the casing able to be mounted to or be incorporated within the first member.

19. The fastener of claim 18, wherein the pivot point for the at least one latch is located inside the casing, with the casing comprising an opening through which a portion of the arcuate portion protrudes when in the fastening position.

20. The fastener of claim 1, wherein an opening is formed in the second member through which the arcuate portion extends when in the fastening position and so as to latch behind a part of the second member located adjacent to the opening.

21. The fastener of claim 20, wherein the opening in the second member is lined by a seating ring behind and against which a part of the arcuate portion engages when in the fastening position.

22. A first member comprising a fastener able to be mounted or incorporated with respect to the first member to enable the first member to be secured to a second member, the fastener comprising at least one latch, the at least one latch comprising an arcuate portion and a linking portion, the arcuate portion being connected by the linking portion to a pivot point that is able to be located with respect to the first member so that, as the linking portion pivots around the pivot point, the arcuate portion moves along an arcuate path between a non-fastening position and a fastening position in which the arcuate portion extends beyond the first member to engage with the second member to secure it to the first member, wherein the fastener is mounted to or incorporated within the first member, and wherein the fastener further comprises a mechanical drive positioned to engage with the arcuate portion such that movement of the mechanical drive causes the at least one latch to pivot between the non-fastening and fastening positions.

23. The first member of claim 22, wherein the fastener is mounted within or formed as part a recess preformed in the first member.

24. A second member comprising a passage arranged to receive an arcuate portion of at least one latch of a fastener able to be mounted or incorporated with respect to a first member to enable the first member to be secured to the second member, the fastener comprising at least one latch, the at least one latch comprising an arcuate portion and a linking portion, the arcuate portion being connected by the linking portion to a pivot point that is able to be located with respect to the first member so that, as the linking portion pivots around the pivot point, the arcuate portion moves along an arcuate path between a non-fastening position and a fastening position in which the arcuate portion extends beyond the first member to engage with the second member to secure it to the first member, and the fastener further comprising a moveable mechanical drive engageable with the arcuate portion to cause the at least one latch to pivot between the non-fastening and fastening positions.

25. The second member of claim 24, wherein the passage is a slot or a circular hole.

26. The second member of claim 24, wherein the passage extends right through the second member.

27. The second member of claim 24, wherein the passage is lined by a seating ring.

28. The second member of claim 24 that is a wall or panel into which the passage extends.

29. A fastener system comprising:
a fastener able to be mounted or incorporated with respect to a first member to enable the first member to be secured to a second member, the fastener comprising at least one latch, the at least one latch comprising an arcuate portion and a linking portion, the arcuate portion being connected by the linking portion to a pivot point that is able to be located with respect to the first member so that, as the linking portion pivots around the pivot point, the arcuate portion moves along an arcuate path between a non-fastening position and a fastening position in which the arcuate portion extends beyond the first member to engage with the second member to secure it to the first member, and the fastener further comprising a mechanical drive that is positioned to engage with the arcuate portion such that movement of the mechanical drive causes the at least one latch to pivot between the non-fastening and fastening positions;
the first member to which the fastener is able to be mounted or in which it is able to be incorporated; and
the second member comprising a passage for receiving the arcuate portion of the at least one latch of the fastener.

30. A method of fastening a first member to a second member using a fastener able to be mounted or incorporated with respect to the first member to enable the first member to be secured to the second member, the fastener comprising at least one latch, the at least one latch comprising an arcuate portion and a linking portion, the arcuate portion being connected by the linking portion to a pivot point that is able to be located with respect to the first member so that, as the linking portion pivots around the pivot point, the arcuate portion moves along an arcuate path between a non-fastening position and a fastening position in which the arcuate portion extends beyond the first member to engage with the second member to secure it to the first member, the method comprising:
mounting the fastener to or incorporating the fastener in the first member, whereby the arcuate portion of the at least one latch is in the non-fastening position;
aligning the fastener with a passage in the second member that is arranged to receive the arcuate portion of the at least one latch in the fastening position; and
causing the at least one latch to pivot via a mechanical drive to the fastening position to thereby fasten the first member to the second member.

31. The method of claim 30, wherein the fastener is mounted to or incorporated in, or the passage is formed, in the first or second member respectively during fabrication of the first or second member.

* * * * *